Figure 1:
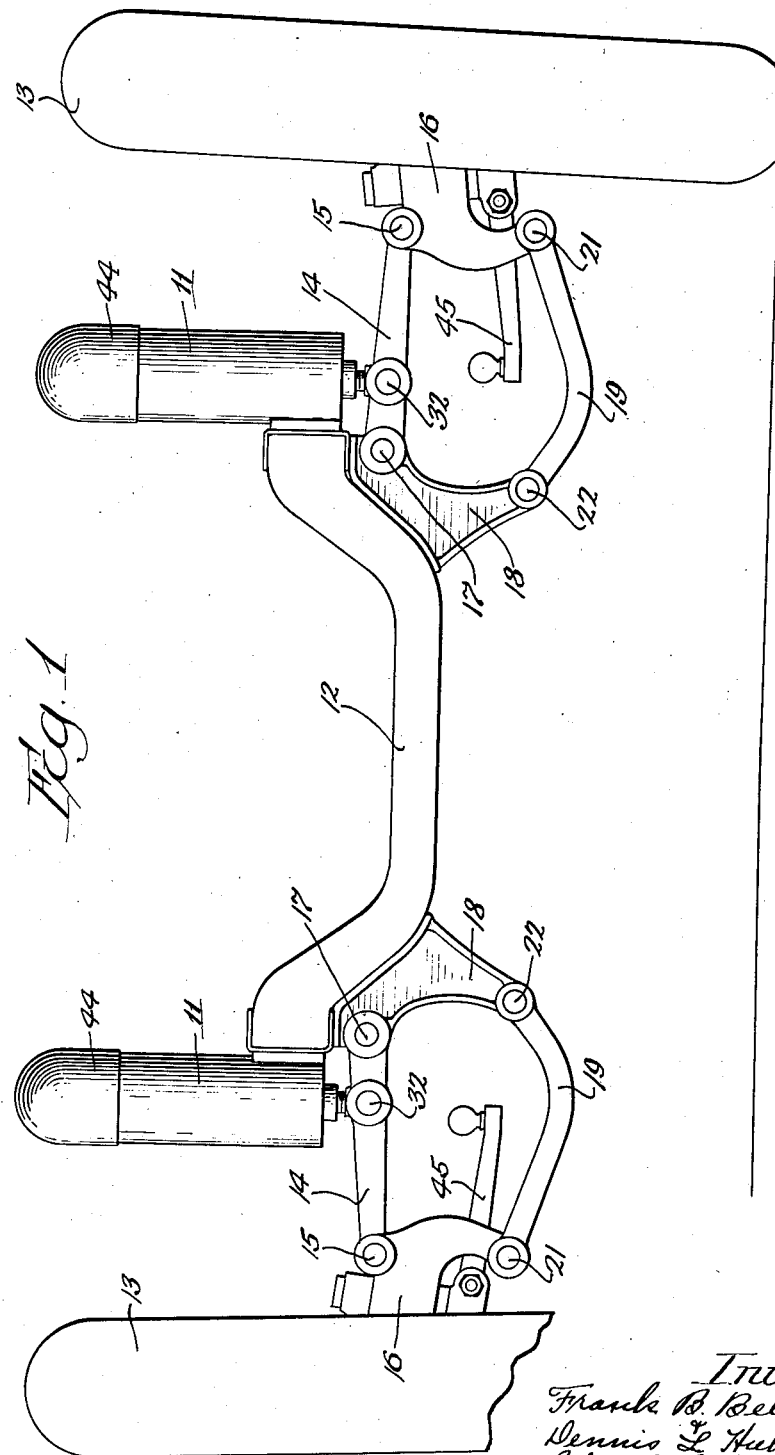

July 3, 1934.  F. B. BELL ET AL  1,965,447
FRONT SPRING FOR AN AUTOMOBILE
Filed Oct. 18, 1930  2 Sheets-Sheet 1

Inventors
Frank B. Bell
Dennis L. Hubbard
John C. Carpenter
Atty.

July 3, 1934.  F. B. BELL ET AL  1,965,447
FRONT SPRING FOR AN AUTOMOBILE
Filed Oct. 18, 1930   2 Sheets-Sheet 2

Inventors
Frank B. Bell
&
Dennis L. Hubbard
John C. Carpenter
Atty.

Patented July 3, 1934

1,965,447

UNITED STATES PATENT OFFICE 1,965,447

FRONT SPRING FOR AN AUTOMOBILE

Frank B. Bell and Dennis L. Hubbard, Pittsburgh, Pa., assignors to Edgewater Steel Company, Pittsburgh, Pa., a corporation of Pennsylvania Application October 18, 1930, Serial No. 489,547

1 Claim. (Cl. 280—124)

This invention relates in general to spring assemblies and shock absorbing devices and while it will be hereinafter described as embodied in a spring assembly installed at the front end of an automobile, it will be apparent that it has other valuable application.

The principal object of the present invention is the provision of a spring assembly for automobiles and other vehicles adapted to absorb and dissipate in friction the major portion of both minor vibrations and shocks and the more severe impacts and jars of service.

A further important object of the invention is the provision of a spring assembly of the character described which may be installed at the front of the chassis of an automobile to cushion the vibration and jars received by the front wheels.

Numerous other objects and advantages of the invention will be apparent as it is better understood from the following description, which, taken in connection with the accompanying drawings, discloses a preferred embodiment thereof.

Figure 2:
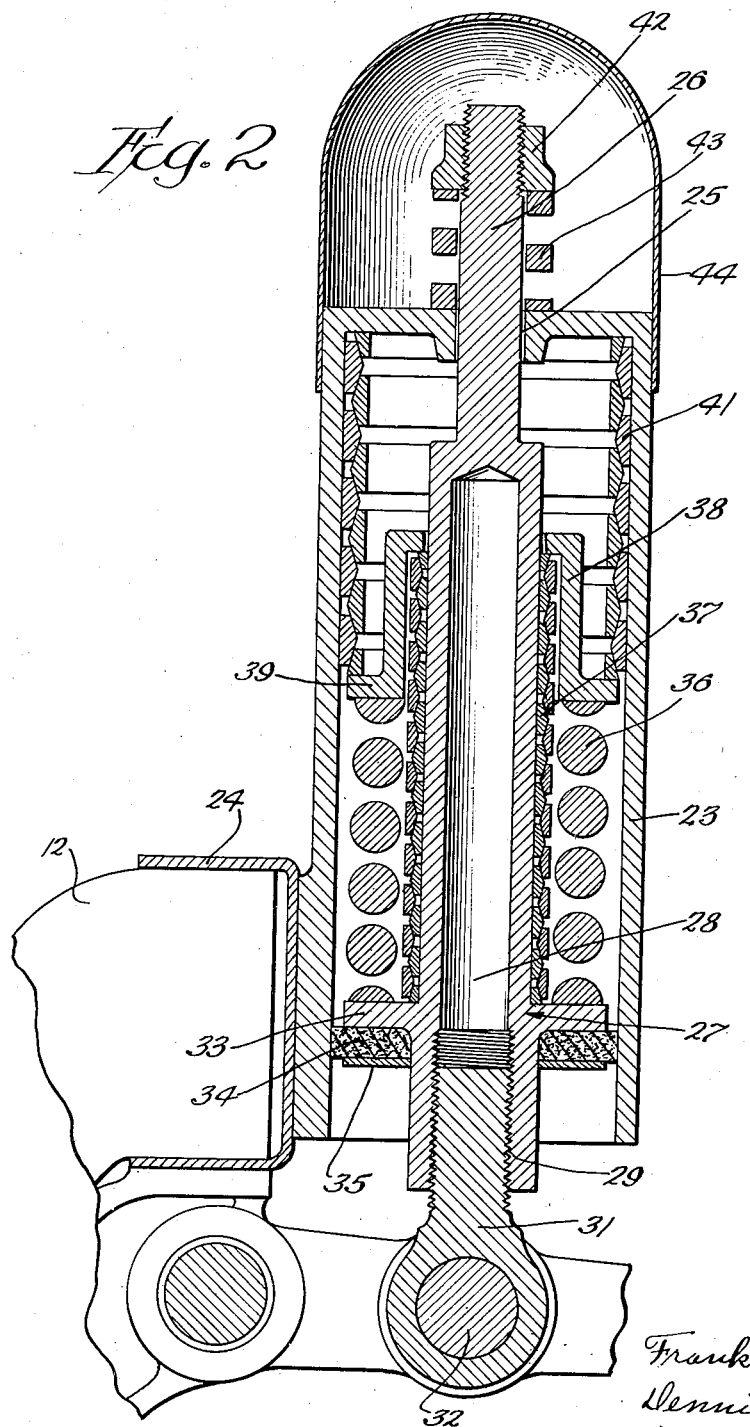

Referring to the drawings:

Figure 1 is a schematic elevation showing spring assemblies embodying my present invention installed at the front end of an automobile; and Fig. 2 is a transverse enlarged vertical section through one of the spring assemblies shown in Fig. 1.

For the purpose of illustrating the present invention, there is shown on the drawings two spring assemblies generally indicated at 11 and arranged at opposite sides of a chassis part or axle 12. Reference characters 13 indicate the two front wheels of the vehicle and these wheels are connected to the chassis frame part 12 by upper links or connectors 14 pivoted respectively at 15 to king pin carrying members 16, and at 17 to a bracket 18 in turn fixed and by lower links or connectors 19 which are similarly connected at 21 and 22 to the members 16 and 18.

Each spring assembly 11 comprises an outer spring housing 23 secured in any suitable manner as by a channel 24 to the frame part 12. Each housing 23 is provided at its top with an opening 25 through which a rod or stem 26 of a plunger 27 is arranged. The plunger 27 at its lower end is provided with a bore 28 threaded at 29 for engagement with a coupling or member 31 pivotally connected at 32 to the upper link or connector 14. The plunger or piston 27 consists or may consist of a flange 33 integral with the rod 26 and a packing 34 held in place by a disc 35 and in engagement to the inner surface of the housing 23.

In the present embodiment of the invention a coil or non-friction spring 36 and a ring or friction spring 37 are arranged in parallel and for conjoint action. A follower sleeve 38 having an outwardly extending flange 39 embraces the rod 26 and engages the springs 36 and 37. A second ring or friction spring 41 is arranged between the flange 39 and the upper end of the housing.

The ring springs 37 and 41 are preferably of the construction shown, described and claimed in United States Letters Patent to Ernest Kreissig No. 1,515,456, and particular description of them is not believed necessary. It may be mentioned, however that they consist generally of alternately arranged outer and inner solid ring members having the tapered or bevelled interengaging faces shown, spring action being accomplished by the stretching and compression of the metal forming the individual rings. Spring 37 is relatively weaker than the spring 41 and this spring with the non-friction coil spring 36 absorbs and cushions the minor vibrations and shocks of the vehicle when travelling over relatively smooth roads and pavements, the heavier jars and impacts being absorbed by friction ring spring 41.

The upper end of the rod 26 is engaged by a nut 42 and a coil spring 43 is preferably arranged between this nut and the upper end of the housing. A cap 44 is or may be provided to enclose the upper end of the rod 26 and the spring 43.

The spring assembly is secured, as has been described, to the chassis and is connected to the upper link connectors. No special construction of the chassis or of the link connectors is required. Further, it will be apparent that thus arranged power mechanism may be arranged from the chassis to the front wheels, and that the usual steering mechanism 45 may be employed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A spring support for an automobile, including in combination a transverse chassis member, a bracket member, an axle carried by the bracket member and a wheel mounted on said axle, upper and lower spaced parallel acting links pivotally connected at their inner ends to said chassis member for swinging movement in a vertical plane, and pivotally connected at their outer ends to said bracket member, and a spring assembly carried by said transverse chassis member and disposed above said links and directly in line with the plane of movement of said links, said spring assembly being operatively connected to said upper link, and including a compression spring for absorbing minor shocks, an expansible friction device for absorbing major shocks, and a second compression spring for absorbing the recoil of said parts.

FRANK B. BELL.
DENNIS L. HUBBARD.